Oct. 11, 1949.    A. J. JANES    2,484,410
FLOATING BRAKE SHOE MOUNTING
Filed Aug. 29, 1947

*INVENTOR.*
ANDREW J. JANES
BY
Barnett + Barnett
ATT'YS.

Patented Oct. 11, 1949

2,484,410

UNITED STATES PATENT OFFICE 2,484,410

FLOATING BRAKE SHOE MOUNTING

Andrew J. Janes, Chicago, Ill.

Application August 29, 1947, Serial No. 771,163

3 Claims. (Cl. 188—78)

This invention is directed to new and useful improvements in floating brake shoe mounting and is particularly directed to the means necessary to convert the conventional automobile brake assembly to an improved one embodying the inventions herein set forth.

The conventional automobile brake comprises a pair of shoes pivotally anchored at adjacent ends with means to spread the other ends to cause the shoes to contact the brake drum. The anchoring means comprises a pair of like bolts, one for each shoe, and a circular bearing portion eccentrically mounted on each of the bolts. These bearing portions fit within circular openings in the ends of the shoes and the shoes are permitted to pivot on these bearings but no other relative movement is possible because the circular bearings and holes in the shoe ends exactly fit. The relative positions of the shoes to the drum may be regulated or adjusted by turning the bolts and the eccentric bearing portions will move the shoes toward or away from the drum as desired. The term "conventional brake" as hereinafter used relates to the type of brake assembly just described.

An objection to this type of brake shoe mounting is that the portions of the shoes adjacent the anchoring bolts do not come in contact with the drum due to the rigid but pivotal mounting of the shoes on the anchor bolts which does not allow radial movement.

The primary object of this invention is to provide a novel means for mounting the shoes whereby the entire surface of each shoe contacts the drum when the brake is applied during forward movement of the car. It is unimportant to improve the braking action when the car is moved rearwardly because this occurs relatively seldom as compared with the number of times the brakes are applied to resist the forward movement and furthermore an automobile is moved rearwardly only at low speeds and highly efficient braking is not needed.

Another object of this invention is to provide a set of simple, inexpensive parts that are adapted to replace certain parts of the conventional brake mounting to convert the brakes to embody the improvements of this invention so that smoother braking is obtained and wear on the brake lining is uniform.

Still a further object is to provide a simple, inexpensive brake shoe mounting whereby the anchored ends of both of the shoes of each brake will be moved toward the drum and in the direction the drum is rotating when the car is moving forwardly, whenever the other ends of the shoes are spread apart by the brake applying action.

Another object is to provide the necessary auxiliary means for returning the rearward shoe of each brake to normal position after the braking action.

Still a further object is to provide a simple means whereby the anchored end of the forward shoe energizes the rearward shoe to cause it to move against the drum when brakes are applied.

Further objects and advantage will become apparent from the following detailed description.

Figure 1:
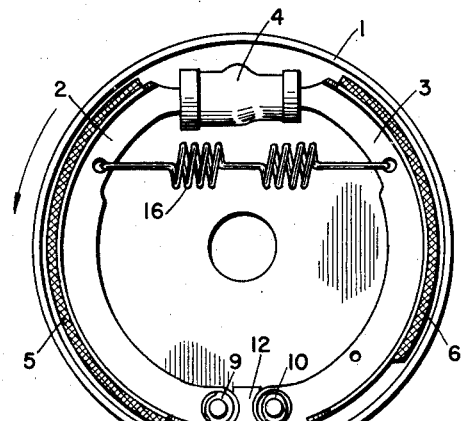
Fig. 1 is an inner side elevation view of a brake assembly embodying the new brake shoe mounting of this invention with anchor plate and spring removed.
Figure 2:
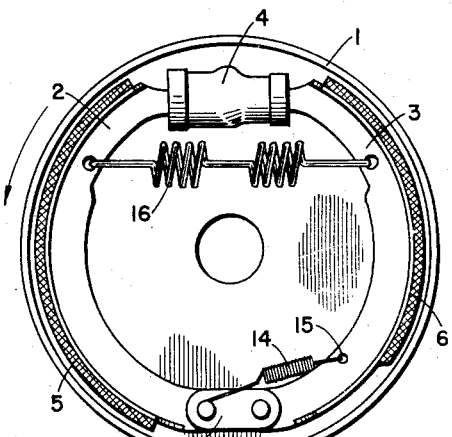
Fig. 2 is a similar view to Fig. 1 but with anchor plate and pull-back spring in position.
Figure 3:
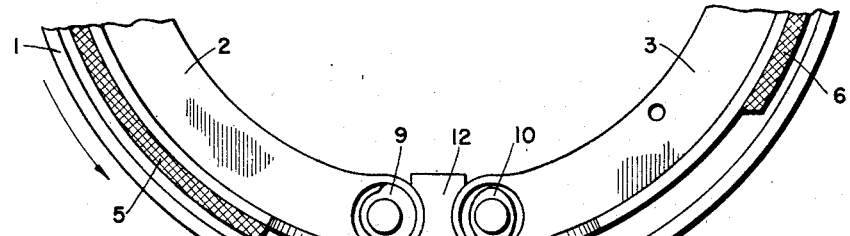
Fig. 3 is an enlarged view of the floating brake shoe mounting showing the assembly in neutral or non-operative position.
Figure 4:
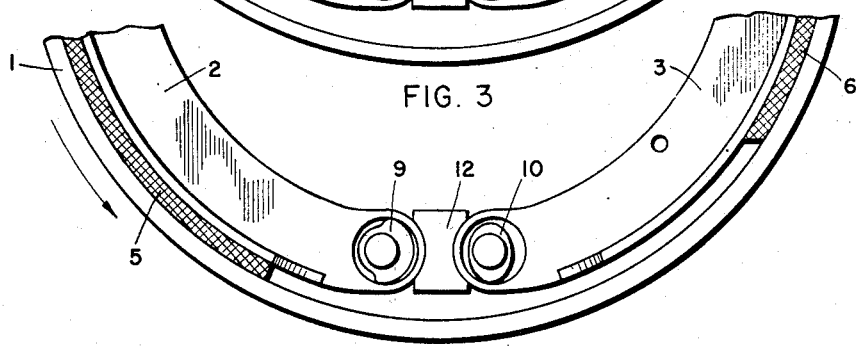
Fig. 4 is a view similar to that of Fig. 3 but showing the assembly in positions taken after brakes have been applied.

In detail, the assembly comprises the usual brake drum 1, and a pair of brake shoes 2 and 3 mounted at their upper ends for expansion or separation by any well known means 4 which usually comprises an hydraulic cylinder unit, the details of which are immaterial to this invention. Brake lining 5 is shown on the front shoe 2 and lining 6 on rear shoe 3.

The lower ends of the brake shoes are usually mounted rigidly on bearings carried by bolts that fit closely within the holes in the lower ends of the shoes. These bearings are mounted eccentrically on the bolts so that by rotating the bolts the bearings will cause the shoes to move toward or away from the brake drum thus providing a means of adjustment. Otherwise the shoes are rigidly pivoted on the bearings.

Figure 5:
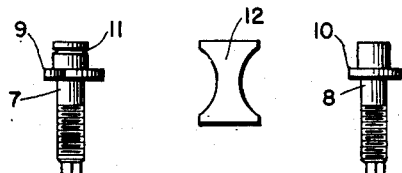
Fig. 5 is a side elevational view of the parts necessary to convert the conventional shoe mounting to the mounting shown in the other figures.
Figure 5:
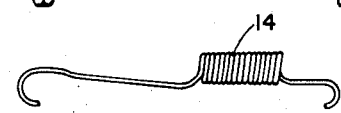

In the present invention the conventional bolts are removed and replaced by bolts 7 and 8 of Fig. 5 that fit the holes in the drum that retained the usual or conventional anchor bolts. The same lock nuts of the conventional assembly will hold them in adjusted position, as is well known in the art. These bolts are similar to the conventional bolts except that the bearing surface on bolt 7, the forward bolt, comprises an integral cam 9 that permits relative movement of shoe 2 and bolt 7 and the bearing surface on bolt 8, the rear bolt, comprises an integral, non-round cam surface 10 which likewise permits relative movement of shoe 3 and bolt 8. Also the inner end of bolt 7 is provided with a groove 11. Cam 9 is provided with a curved portion of the same curvature as that of the hole in the shoe to provide a stop shoulder against which the shoe will bear when in non-operative position. The cam 9 otherwise fits loosely within the hole, its extreme diameter being less than that of the hole to provide relative movement between the shoe and the cam. The cam is cut away opposite the above mentioned curved portion to permit the shoe to move away from the stop shoulder. The lower part of the cam is normally in contact with the inner surface of the lower part of the hole in the shoe. Thus it will direct that end of the shoe radially toward the drum as it is moved circumferentially by the rotating drum when the brakes are applied. The distances of movement of the shoe relative to the drum are very small being measured in thousandths of an inch inasmuch as the normal adjustments between brake shoes and drums are from .008 to .010 inch clearance.

Cam 10 is of oval shape the long axis being vertical, this long diameter being less than the diameter of the hole in the rear shoe. This permits movement of the shoe relative to the cam. The lower part of cam 10 will normally contact the lower part of the inner surface of the hole so that when the back shoe is urged circumferentially the cam will direct it radially as well.

Otherwise the cams are similar to the conventional anchor bolt bearings being slightly eccentric to the bolt for the usual manual adjustment of the brake shoe position relative to the drum.

To complete the assembly, the spacer 12 is positioned between the ends of shoes 2 and 3, the original anchor plate cover 13 is placed over the heads of the bolts 7 and 8 and spring 14 is hooked into hole 15 that has been drilled in rear shoe 3 and hooked in groove 11 of bolt 7. This holds the cover 13 in position and provides means for returning the rear shoe to original position after a braking operation. By means of this novel assembly both front and rear brake shoe linings are brought into smooth and full contact with the brake drum whenever the brake lever is operated to expand the brakes.

In operation, the brake drum 1 is rotating in the direction indicated by the arrow. As the brake lever is operated the means 4 acts to separate the upper ends of the brake shoes. This brings the upper parts of the shoes into contact with the brake drum. This drum moving in the direction of the arrow exerts a force on the front shoe 2 tending to move it in the same direction. Because of the floating mounting of the lower end of the shoe on bolt 7 a limited movement in the direction of rotation is permitted. The cam surface 9 thereupon directs the lower end of shoe 2 towards the brake drum until it comes in contact with the drum and it is held in that applied position by cam 9 so long as the brake is applied.

The movement of front shoe 2 in the direction of rotation is transmitted through spacer 12 to rear shoe 3 and cam 10 likewise directs the lower end of shoe 3 towards and against the brake drum so long as the brake is applied.

When brake is released the expanding means 4 permits the shoes to resume their original position at the top of the assembly and spring 16 causes their return. Spring 14 will move rear shoe 3 back to its original position.

Thus by providing two novel cam bolts, a spacer and a spring the conventional brake assembly can be improved vastly at small expense and with little installation difficulty.

It should be noted that cams 9 and 10 differ in shape. Cam 9 is shaped at its rearward side to conform to the contour of the hole in the shoe 2. This provides a positive stop limiting the return movement of shoe 2 after a braking operation. Cam 10, however, is so shaped that shoe 3 is not stopped by the cam when returning from braking operation. This permits shoe 3 to follow freely the movement of shoe 2 through spacer 12. Thus the rear shoe 3 is at all times really bearing against the end of shoe 2 so as to be energized immediately upon any circumferential or radial movement of shoe 2. This effects complete cooperative movement between the two shoes which would not be possible if each shoe had its separate return stop.

I claim:

1. In combination with a conventional automobile brake assembly comprising a drum and a front and rear shoe having openings at adjacent ends for mounting, means floatingly mounting said shoes comprising a pair of bolts each carrying a cam eccentrically mounted thereon and fitting loosely within the openings in the ends of said shoes, a spacer fitting between and abutting both of the said ends of the shoes, and resilient means pulling said shoes against said cams in a direction opposite to the forward rotation movement of the drum but permitting both shoes to move radially and circumferentially in the direction of forward movement of the drum, said cams being positioned to direct the anchored end of each shoe toward the drum as it moves in the direction of forward drum rotation.

2. In combination with a conventional automobile brake assembly comprising a drum and a front and rear shoe having openings at adjacent ends for mounting, means for floatingly mounting said shoes comprising a pair of bolts each carrying a cam eccentrically mounted thereon and fitting loosely within the openings in the ends of said shoes, a spacer with concave bearing portions on each side fitting between and abutting both of the said ends of the shoes, and resilient means pulling said shoes against said cams in a direction opposite to the forward rotation movement of the drum but permitting both shoes to move circumferentially in the direction of forward movement of the drum, said cams being so arranged to direct each shoe radially toward the drum as it moves circumferentially in the direction of forward drum rotation.

3. In combination with a conventional automobile brake assembly comprising a drum and a front and rear shoe having openings at adjacent ends for mounting, means floatingly mounting said shoes comprising bolts each carrying a cam bearing surface fitting loosely within said openings in the ends of said shoes, the cam on the bolt anchoring the front shoe being shaped to direct the anchored end of the shoe radially towards the drum and circumferentially when moved in the direction of drum rotation but limiting circumferential movement in the opposite direction, the cam on the bolt anchoring the rear shoe being shaped to permit circumferential movement of the shoe in either direction and to direct the shoe radially towards the drum when moved in the direction of the drum rotation, a spacer fitting between and abutting the ends of said shoes and a spring anchored to the rear shoe to pull it at all times against the spacer, whereby the rear shoe through said spacer is energized by any movement of the front shoe.

ANDREW J. JANES.

REFERENCES CITED

The following references are of record in the file of this patent:

UNITED STATES PATENTS

| Number | Name | Date |
|---|---|---|
| 1,619,806 | Bendix | Mar. 8, 1927 |
| 1,667,395 | Sanford | Apr. 4, 1928 |
| 1,771,843 | Dodge | July 29, 1930 |
| 1,851,357 | Gunn | Mar. 29, 1932 |
| 2,060,886 | McConkey | Nov. 17, 1936 |
| 2,348,500 | Sawtelle | May 9, 1944 |

FOREIGN PATENTS

| Number | Country | Date |
|---|---|---|
| 624,044 | France | Mar. 29, 1927 |